Patented Jan. 5, 1932

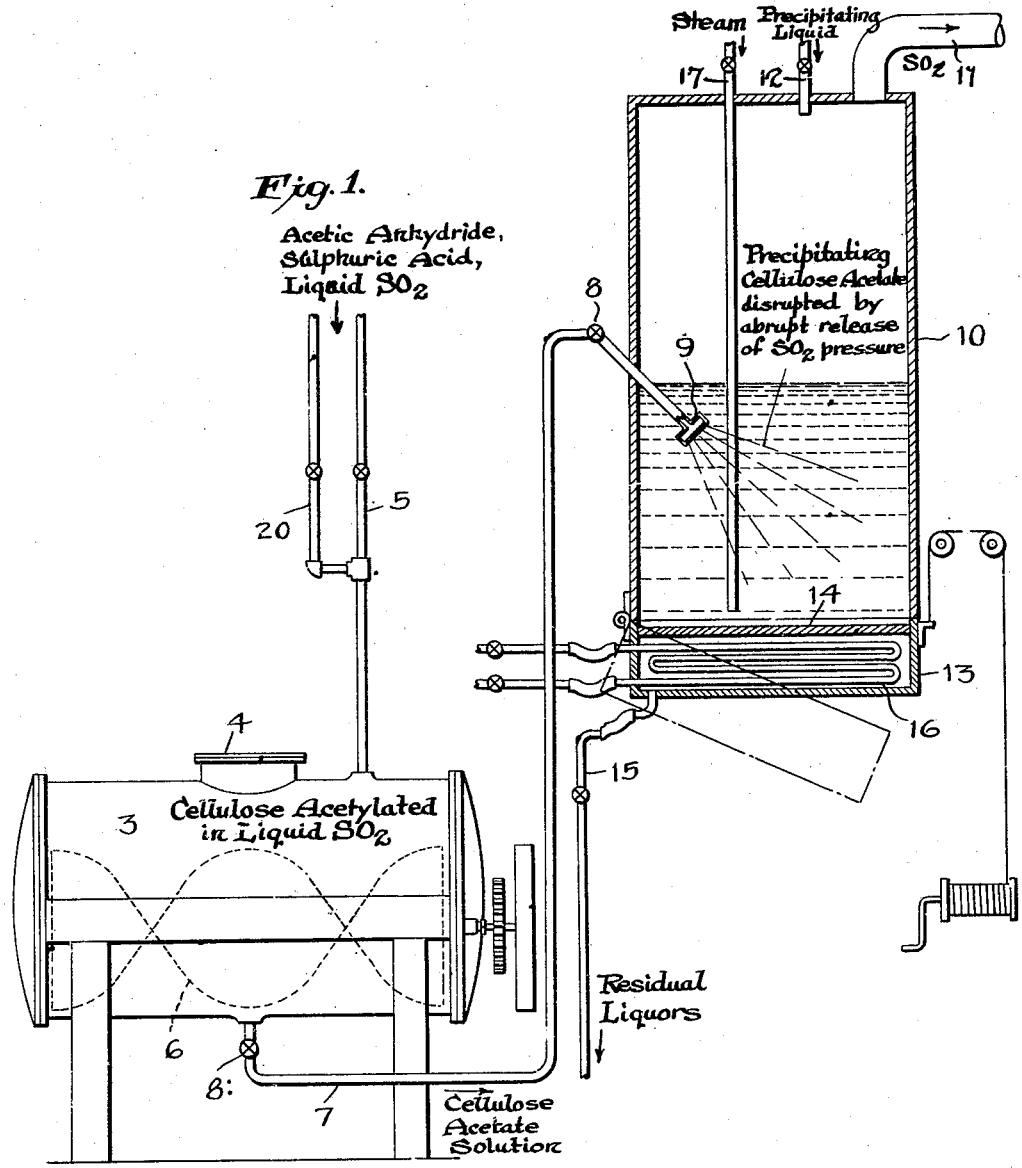

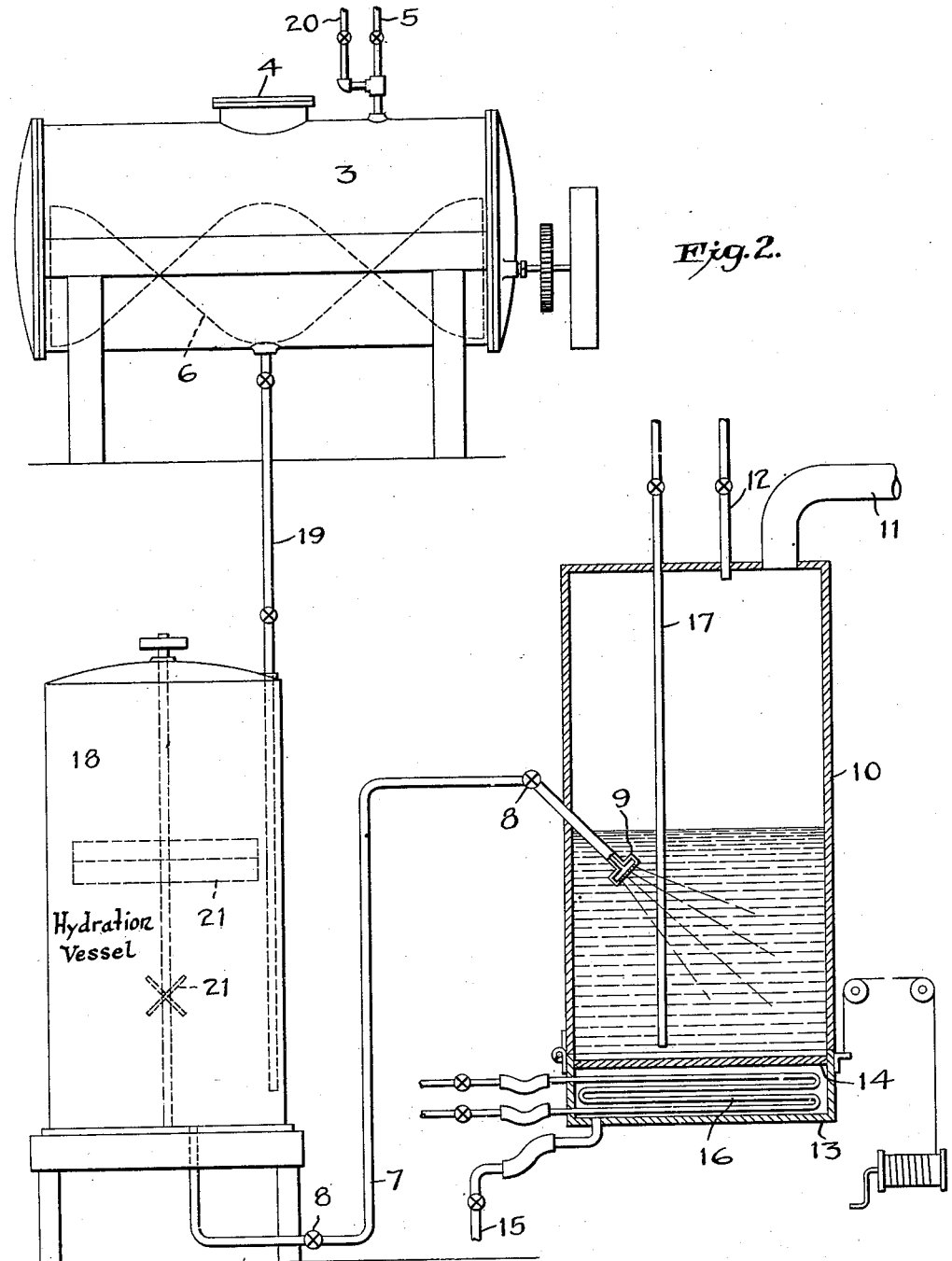

1,839,295

UNITED STATES PATENT OFFICE

LLOYD M. BURGHART, OF BALTIMORE, MARYLAND, ASSIGNOR TO U. S. INDUSTRIAL ALCOHOL CO., OF NEW YORK, N. Y., A CORPORATION OF WEST VIRGINIA

METHOD OF MAKING AND TREATING CELLULOSE ESTERS AND PRODUCTS THUS OBTAINED

Application filed April 30, 1929. Serial No. 359,367.

This invention relates to the manufacture and treatment of cellulose esters of organic acids, specifically cellulose acetate, in order to obtain the same in a physical condition favorable for subsequent treatments, and to the products thus obtained.

In my copending application, Serial No. 256,817, filed February 24, 1928, of which this application is a continuation in part, I disclosed a process for making cellulose acetate, in which liquid sulfur dioxid is employed to advantage as the reaction medium or solvent. As such, it may be said to take the place of the glacial acetic acid usually employed for that purpose, and it follows that, in my process, the liquid medium may include acetic acid or other ingredient to replace part of the liquid sulfur dioxid, or in addition thereto. While the liquid sulfur dioxid does not appear to enter into the reaction, it seems reasonable to assume that it has a chemical or catalytic influence. Thus, chloroform, which is the typical solvent for the so-called "primary" cellulose acetate produced in the first part of the usual acetylation operations, behaves quite differently from acetic acid, and can not effectively replace the latter as the liquid medium for the reaction between cellulose and the acetylating agent, such as acetic anhydride, acetyl chlorid or a mixture of such agents. Liquid sulfur dioxid, on the other hand, does resemble glacial acetic acid, in effect; that is to say, it is made to serve as a medium which favors acetylation.

As further disclosed in the said application, the liquid sulfur dioxid is also well adapted to serve as a medium or solvent for a subsequent, or then-ensuing hydration treatment, the effect of this treatment, like other hydration treatments being to alter the cellulose acetate from the chloroform-soluble form, or possibly the alcohol-chloroform-soluble form, which resulted from the acetylation reaction, to a form which has a different type or range of solubility. The acetone-soluble form is usually sought, since it is soluble in a number of solvents which are desirable from the point of view of eventual manufacturing operations in which the cellulose acetate is employed. The hydration treatment can also be so conducted as to modify the cellulose acetate so that it becomes readily soluble in acetic ether (ethyl acetate).

The scientific theory of what takes place in these so-called hydrating, hydrolyzing or saponifying after-treatments is somewhat doubtful. It has been variously explained as a partial de-acetylation, the introduction of hydroxyl groups into the cellulose acetate molecule, and a partial degradation of the complex molecular aggregate. It is usually accomplished by the incorporation of a limited amount of water in the solution or fluid mixture containing the cellulose acetate and by digesting for a suitable period. As stated in my prior application, I have found that water, a mixture of alcohol and water, or even alcohol alone, may be employed as the added hydrating agent, with liquid sulfur dioxid present as a medium.

It was also disclosed in the said application that, at the conclusion of the acetylation reaction, if a hydration treatment was not then to follow, the contents of the closed pressure-retaining vessel, in which the acetylation with liquid $SO_2$ was performed, would be discharged into water to precipitate or coagulate the chloroform-soluble, or alcohol-chloroform-soluble, ester. Likewise, if the process of manufacture was continued by proceeding with an after-hydration treatment in the mixture resulting from the acetylation, and still in a closed pressure chamber to retain the sulfur dioxid in the liquid state, the reaction mass or solution at the end of that operation would be discharged into contact with precipitating liquid, to separate the acetone-soluble cellulose acetate.

In this connection, an important step was described, consisting in suddenly releasing the sulfur dioxid gas pressure from within the mass as the latter leaves the pressure system. In the typical example of precipitation with water, this can be accomplished by opening a valve in a pipe connected with the bottom of the vessel, the end of the pipe being preferably submerged in a body of water, and the region where separation or precipitation occurs being at atmospheric pressure, or at very much lower pressure than the high pressure which existed in the closed chamber. As the solution or mixture passes the valve or emerges from the pipe, the sulfur dioxid constituent of the stream is free to pass into the gaseous state and to expand enormously, this taking place quite abruptly from within the stream, so that the issuing cellulose acetate as it gathers together is disrupted and expanded. In this way a product is obtained of low apparent density and loose structure. The opening up of the precipitated masses favors easy penetration of washing liquid, thereby facilitating removal of unused acetic acid values and other substances which may be present. Furthermore, the physical condition of the ester is such that bleaching, purification, stabilizing and other subsequent operations involving the penetration of treating agents are made much easier. Also, the loose structure makes possible quick and easy drying, and is an advantage when it comes to dissolving the finished products in various solvents prior to use.

The cellulose acetate products thus obtained, whether of the chloroform-soluble, alcohol-chloroform-soluble, or acetone-soluble type, or other type of solubility, may vary in the degree of subdivision, but generally speaking are loose, fluffy, and of low apparent density. Aside from the apparent form, it is evident that the material is much affected in its structure by the expanding force.

The precipitation is effected with the aid of water or other liquid in which the cellulose ester is insoluble and by which it is coagulated. This may be accomplished in different ways. In the procedure herein illustrated the solution containing the ester is delivered into a body of water through small orifices. As the sulfur dioxide passes from the liquid state into the state of gas or vapor, there is a chilling effect, which, if there was too little precipitation water at too low a temperature, would tend to retard the liberation of the gas and to freeze a part of the water, thus causing the production of irregularly precipitated masses. A large enough body of water at room temperature is sufficient to supply this latent heat of vaporization. The water may be warmed anywhere up to about 50° C., or heat may be supplied at the region of discharge in any other suitable way, and such heating will naturally favor even more abrupt, regular and complete liberation of the gas.

The precipitating liquid probably tends to form films at the surfaces of the expanding globules, which are then ruptured by the internal pressure, and it seems likely that the collapse of such films and the further setting of the cellulose ester accounts for the kind of gross structure which may be obtained.

The water also dilutes any acetic acid present below its solvent strength for the cellulose ester, thereby assisting in the precipitation and disruption of the masses.

A dilute solution of acetic acid may be used as the precipitating liquid in order to make it easier to handle the resulting liquors more economically in acetic acid recovery operations, but it will be understood that the strength of the solution that may be employed should be such that the final concentration is below that which will dissolve the cellulose acetate.

The use of other precipitating liquids will be referred to hereinafter.

In the accompanying drawings forming part hereof:

Fig. 1 is a view partly in elevation and partly in section of one form of equipment for making the cellulose ester and for precipitating it in accordance with this invention; and Fig. 2 is a similar view of another combination of equipment for carrying out the invention.

In Fig. 1, the numeral 3 designates a closed reaction vessel adapted to retain the required pressure, this vessel being provided with a cover 4 which can be tightly closed and can be removed, and with valved inlets 5 and 20 for introducing liquid materials. Within the vessel there is a stirrer 6 arranged to be driven by power. A discharge pipe 7 is connected with the lower portion of the vessel and is provided with one or more valves 8. This pipe preferably terminates in a nozzle 9 having a suitable number of comparatively small exit openings, and when the charge is precipitated this nozzle is preferably below the level of a body of water or other precipitating liquid in a chamber 10. This chamber is enclosed and has an offtake 11 for collecting and freely conducting away the sulfur dioxid gas, to the liquefied for re-use. The region inside the enclosure 10 may be considered an expansion chamber. The pressure therein at the time of precipitation may be atmospheric or somewhat above, or the pressure may be reduced to any desired degree below atmospheric presure by appropriate means.

The precipitation chamber is shown provided with a valved inlet 12 for admitting precipitating liquid, and with a tight hinged bottom 13 for discharging the precipitated cellulose, after the liquid has been drawn off through a filter 14 and a valved line 15 leading to an acetic acid recovery system. A moderate amount of heat may be supplied by a steam coil 16 in the bottom 13 beneath the filter 14, or by a valved steam line 17 having its outlet a short distance above the filter 14 so as to be submerged by the body of precipitating liquid.

The material treated for esterification may be cellulose in any suitable form, or a cellulose derivative, for example, hydrocellulose, and the acetylation may be preceded by any appropriate pre-treatment.

The following is given as a specific example. 100 parts of cellulose, 260 parts of acetic anhydride as an acetylating agent, 1000 parts of liquid sulfur dioxid, and 3 parts of sulfuric acid as a catalyst or condensing agent, are digested and stirred in the vessel 3 at a suitable temperature, at about 20°–30° C., and at corresponding pressure, until test shows that the reaction has proceeded to the desired degree.

The cellulose or cellulose derivative is placed in the vessel through the opening which is ordinarily tightly closed by the cover 4, and the liquid materials may be introduced through the valved inlet 5.

As indicated in my original application, the proportions of the ingredients may be varied. The temperature may also be varied. The time required may vary from about 6 to 18 hours depending upon conditions, for example, the amount of the liquid medium employed in relation to the other ingredients, the temperature and the efficiency of the stirring mechanism.

During the course of the treatment the cellulose loses its original structure and the cellulose acetate apparently dissolves in the liquid sulfur dioxid, the result at the end of the operation being that of a thickish liquid or semifluid mass, practically homogeneous and readily flowable through pipes under pressure of the $SO_2$ gas or vapor; the precise consistency of the fluid mass or liquid medium varying according to the amount of liquid medium present and other conditions. It is difficult to say whether the condition is strictly that of a colloidal solution, dispersion or suspension, or whether the mass is a fluid mixture akin to these, but for practical purposes it can be regarded as a solution.

In the example given, it will be understood that the solution of cellulose acetate in liquid sulfur dioxid existing when the acetylation reaction has been carried to the desired point, contains also the small amount of catalyst, the surplus acetaic anhydride and some acetic acid.

If cellulose acetate of a type resulting from an acetylation reaction is desired, or if the acetylation operation is not to be followed by a hydration treatment in the same general solution, the valve or valves 8 are now opened, and the fluid mass is delivered by the pressure of the $SO_2$ through the pipe 7 and its perforated nozzle 9 into contact with the water in the chamber 10. By the abrupt release of the gas pressure from the issuing streams the chloroform-soluble or alcohol-chloroform-soluble cellulose acetate is disrupted at the moment of precipitation, in the manner which has been described.

The employment of precipitating liquids other than water is permissible and presents certain advantages. For example, in order to avoid the breaking down of the surplus acetic anhydride, which is expensive, and to facilitate recovery of the acetic acid, the solution obtained at this time can be precipitated in similar manner in or with carbon tetrachlorid, benzene, toluene or other non-aqueous precipitating liquid, to secure the light structured ester product.

The precipitating or coagulating liquid may dissolve or retain the substances such as ascetic anhydride, acetic acid and sulfuric acid, and a minor amount of the sulfur dioxid. The precipitated cellulose acetate, after preliminary separation from the liquid, may be washed and dried, and may then constitute an article of commerce; or, after washing or drying, or without performing these operations, it can be re-dissolved in liquid sulfur dioxid and then be subjected to a separate hydration treatment to modify it to another type of solubility.

For various reasons, however, it is advantageous, when the acetone-soluble variety, or some other variety, is desired, to proceed with the hydration treatment without separating the ester from the original $SO_2$ solution or mixture resulting from the acetylation stage. This may be carried out in the same vessel, but for operating economy it is more desirable to transfer the fluid reaction mass from the acetylation vessel to another closed pressure vessel 18, shown in Fig. 2, the two vessels being connected by a valved pipe 19 through which the transfer is made when the valve or valves are opened.

The hydration treatment is essentially a digestion of the solution or mixture, to which has been added a limited amount of a hydrating medium, typically water, the amount of such water being less than will cause precipitation. Instead of water, the hydrating agent may be a mixture of alcohol and water, or in accordance with known practice the hydrating water may be diluted with acetic acid. An additional amount of sulfuric acid or other catalyst may be introduced to speed the reaction. As is well understood, the amount of hydrating agent should be enough to break down the unused acetic anhydride left from the acetylation treatment and leave a surplus of water, a surplus on the order of 3%–5% of the reaction mixture present being sufficient.

The hydrating agent or mixture may be introduced into the vessel 18, but there is a practical advantage in admitting it to the mass in the vessel 3 shortly before the transfer of the contents to the vessel 18, advantage being taken of the thorough mixing action of the stirrer of the acetylating vessel.

As a concrete example, 55 parts of water and 6 parts of sulfuric acid may be introduced through the valved connection 20 to the mixture in the vessel 3 about 20 minutes before the transfer is made, the mass being then run into the vessel 18 and being there digested, preferably with mild stirring by stirrers 21, for 18–36 hours, more or less, until test samples indicate the desired degree of acetone-solubility, or other desired type of solubility. This digestion may be carried out at 65°–70° C., but lower temperatures around 45° C. are preferable.

When the hydration treatment has been carried as far as is desired, the solution is usually more liquid than that resulting from the acetylation reaction, and this solution, consisting of cellulose acetate in solution or suspension in the liquid sulfur dioxid and such amount of acetic acid as is present, together with such other ingredients as there may be, is discharged through the pipe 7 and its nozzle 9, on the opening of the valve or valves 8, into contact with water or other precipitating liquid in a chamber 10 similar to the one already described.

It is sufficient that the pressure at the precipitating and expanding region be approximately atmospheric, though naturally the explosive action of the gas on the colloidal masses may be promoted by partial vacuum or by heat or by both.

The sudden and substantially complete release of the gas pressure from within the precipitating masses and the effect upon the form and structure of the product is substantially the same as in the case of "primary" cellulose acetate.

The invention is also applicable to the manufacture and treatment of other cellulose esters of organic acids, for example cellulose propionate and cellulose benzoate.

The acylating agents may be the anhydrides or the halides of the corresponding acids, or mixtures thereof. Instead of sulfuric acid, other catalysts or promoters known for such operations may be employed, for example zinc chlorid.

The products after being precipitated are washed and dried in a suitable manner.

The invention is also applicable to the treatment of previously manufactured esters of cellulose, obtained by any process of manufacture. For example, cellulose acetate, of any of the types of solubility, which has been made by the usual process in an acetylating bath consisting of acetic anhydride, acetic acid and sulfuric acid, and which has or has not been hydrolyzed, can, at any time, after the completion, or partial completion, of its manufacture, be put into solution in liquid sulfur dioxid and be discharged from the region of high pressure where it is so held into a region of low pressure where it is precipitated in contact with water or any equivalent medium, in order to put the material into the improved physical condition the attainment of which constitutes the ultimate object of the invention herein claimed.

As a further extension of the invention, the cellulose esters can be made and/or hydrated by any of the known processes, for example those utilizing glacial acetic acid as a liquid medium, and when the acylation and/or the hydration has been carried to the desired stage of completion, or before such time, an amount of liquid sulfur dioxid sufficient to provide an enormous volume of gas can be introduced into a closed pressure vessel containing the reaction mixture, and the solution can then be discharged and precipitated in the manner described so as to effect the opening up of the ester masses.

In each of the applications of the invention which have been described a solution, or a condition similar to a solution, of the desired cellulose ester is formed under pressure in liquid sulfur dioxid, though the liquid sulfur dioxid need not be the only solvent present, and the solution or fluid jell is then discharged and precipitated in such manner as to secure the abrupt release of the $SO_2$ gas pressure from within the precipitating material, in order to disrupt the same.

I claim:

1. The method of making cellulose esters of organic acids to obtain the same in a physical condition favorable for subsequent treatments, which comprises reacting the material to be acylated with an acylating agent in the presence of liquid sulfur dioxid as a reaction medium, the operation being carried out under pressure in a closed vessel, and thereafter discharging the cellulose ester in solution in the liquid sulfur dioxide into another region where the sulfur dioxid is suddenly gasified and caused to expand, whereby abrupt release of the gas from within the precipitating masses is brought about to disrupt the same.

2. The method of making cellulose acetate products to obtain the same in a physical condition favorable for subsequent treatments, which comprises reacting upon the material to be acetylated with an acetylating agent in the presence of liquid sulfur dioxid as a reaction medium, and thereafter discharging the cellulose acetate in solution in the liquid sulfur dioxid into another region where the sulfur dioxid is abruptly gasified and released with disruptive effect from within the cellulose acetate as the latter is precipitated.

3. The method of making cellulose acetate products to obtain the same in a physical condition favorable for subsequent treatments which comprises reacting upon the material to be acetylated with an acetylating agent in the presence of liquid sulfur dioxid as a reaction medium, then subjecting the cellulose acetate in the same reaction medium and likewise under pressure to a hydration treatment, and then discharging the cellulose acetate in solution in the liquid sulfur dioxid into an expansion region, where the sulfur dioxid is abruptly gasified and released with disruptive effect from within the cellulose acetate as the latter is precipitated.

4. In the manufacture of acetone soluble cellulose acetate, the steps which comprise subjecting cellulose acetate to a hydration treatment in a solvent medium comprising liquid sulfur dioxid, said treatment being carried out under pressure in a closed vessel, and then discharging the contents of the vessel into an expansion region, where the liquid sulfur dioxid is abruptly gasified and released with disruptive effect from within the cellulose acetate as the latter is precipitated.

5. The method of making cellulose esters of organic acids to obtain the same in a physical condition favorable for subsequent treatments, which comprises reacting the material to be acylated with an acylating agent in the presence of liquid sulfur dioxid as a reaction medium, the operation being carried out under pressure in a closed vessel, and thereafter discharging the cellulose ester in solution in the liquid sulfur dioxid into contact with a precipitating liquid under such conditions that the sulfur dioxid is abruptly gasified and released with disruptive effect from within the precipitating material.

6. The method of making cellulose acetate products to obtain the same in a physical condition favorable for subsequent treatments, which comprises reacting upon the material to be acetylated with an acetylating agent in the presence of liquid sulfur dioxid as a reaction medium, and thereafter discharging the cellulose acetate in solution in the liquid sulfur dioxid into contact with a precipitating liquid under such conditions that the sulfur dioxid is abruptly gasified and released with disruptive effect from within the precipitating material.

7. The method of making cellulose acetate products to obtain the same in a physical condition favorable for subsequent treatments, which comprises reacting upon the material to be acetylated with an acetylating agent in the presence of liquid sulfur dioxid as a reaction medium, then subjecting the cellulose acetate in the same reaction medium and likewise under pressure to a hydration treatment, and then discharging the mixture into contact with a precipitating liquid under such conditions that the sulfur dioxid is abruptly gasified and released with disruptive effect from within the precipitating material.

8. The method of obtaining cellulose esters of organic acids in a physical condition favorable for subsequent treatments, which comprises forming a solution of the cellulose ester in liquid sulfur dioxid, holding said solution under pressure, and discharging the solution into contact with a precipitating liquid under such conditions that the sulfur dioxid is suddenly gasified and released, whereby the abrupt release of gas pressure from within the precipitating masses disrupts the same.

9. The method of obtaining cellulose acetate in a physical condition favorable for subsequent treatment, which comprises forming a solution of cellulose acetate in liquid sulfur dioxid, holding the solution under pressure, and discharging the solution into contact with a precipitating liquid under such conditions that the sulfur dioxid is suddenly gasified and released, whereby the abrupt release of gas pressure from within the precipitating masses disrupts the same.

10. The method of obtaining expanded cellulose acetate which comprises delivering under pressure a stream of a fluid mixture containing the cellulose acetate and liquid sulfur dioxid sufficient to afford a relatively enormous amount of gas, and abruptly releasing the sulfur dioxid from the stream to disrupt the cellulose acetate.

11. A cellulose ester of an organic acid which has been disrupted and expanded in precipitation by sudden release of internal gas pressure supplied by a solvent which exists as a gas under the conditions of precipitation.

12. Cellulose acetate which has been disrupted and expanded in precipitation by sudden release of internal gas pressure supplied by a solvent which exists as a gas under the conditions of precipitation.

13. Acetone-soluble cellulose acetate which has been disrupted and expanded in precipitation from solution by sudden release of internal gas pressure supplied by a solvent which exists as a gas under the conditions of precipitation.

LLOYD M. BURGHART.